US009930837B2

(12) United States Patent
Rowling (10) Patent No.: US 9,930,837 B2
(45) Date of Patent: Apr. 3, 2018

(54) DEMOUNTABLE SILO

(71) Applicant: David Leroy Rowling, New South Wales (AU)

(72) Inventor: David Leroy Rowling, New South Wales (AU)

(*) Notice: Subject to any disclaimer, the term of this patent is extended or adjusted under 35 U.S.C. 154(b) by 109 days.

(21) Appl. No.: 14/898,895

(22) PCT Filed: Jun. 17, 2014

(86) PCT No.: PCT/AU2014/000628
§ 371 (c)(1),
(2) Date: Dec. 16, 2015

(87) PCT Pub. No.: WO2014/201497
PCT Pub. Date: Dec. 24, 2014

(65) Prior Publication Data
US 2016/0135378 A1 May 19, 2016

(30) Foreign Application Priority Data

Jun. 17, 2013 (AU) .............................. 2013902167
Jan. 30, 2014 (NZ) ....................................... 620553

(51) Int. Cl.
*A01F 25/14* (2006.01)
*B65D 88/32* (2006.01)
(Continued)

(52) U.S. Cl.
CPC .............. *A01F 25/14* (2013.01); *B65D 88/32* (2013.01); *B65D 88/528* (2013.01);
(Continued)

(58) Field of Classification Search
CPC .... A01F 25/14; A01F 2025/147; A01F 25/16; A01F 25/166; A01F 25/2027; A01F 25/2036; B65D 88/32
See application file for complete search history.

(56) References Cited

U.S. PATENT DOCUMENTS 90,116 A * 5/1869 Mills ...................... B65D 90/10
454/182
1,775,656 A * 9/1930 Riff ........................ B65D 88/06
52/197

(Continued)

FOREIGN PATENT DOCUMENTS

EP 0896114 A1 2/1999
FR 2715920 A1 * 8/1995 ......... A01F 25/2027

(Continued)

OTHER PUBLICATIONS

International Search Report issued by the ISA/AU in connection with PCT/AU2014/000628 dated Sep. 8, 2014.

*Primary Examiner* — Babajide A Demuren
(74) *Attorney, Agent, or Firm* — Levenfeld Pearlstein, LLC (57) ABSTRACT

The present invention is directed generally to a demountable silo (10) comprising a series of interconnected silo modules (12A to 12F) constructed in accordance with a preferred embodiment of this invention. The silo modules such as (12A) are each of a substantially identical configuration and interconnected in a side-by-side and end-to-end relationship. The demountable silo (10) is designed to contain particulate material and configured depending on the nature of the material and its storage requirements. It will be appreciated that the provision of multiple silo modules such as (12A to 12F) together contains significantly more particulate material in a heap than a single silo module. The maximum storage capacity for the demountable silo (10) is determined largely by the angle of repose of the heaped particulate material.

19 Claims, 9 Drawing Sheets

(51) Int. Cl.
   *B65D 88/52* (2006.01)
   *B65D 90/04* (2006.01)
   *B65D 90/20* (2006.01)
   *A01F 25/16* (2006.01)
   *A01F 25/20* (2006.01)

(52) U.S. Cl.
   CPC ........... B65D 90/043 (2013.01); B65D 90/20 (2013.01); *A01F 25/166* (2013.01); *A01F 25/2027* (2013.01); *A01F 25/2036* (2013.01); *A01F 2025/147* (2013.01)

(56) References Cited

U.S. PATENT DOCUMENTS

| | | | |
|---|---|---|---|
| 3,580,643 A | | 5/1971 | Spitzer |
| 4,498,635 A | * | 2/1985 | Fielding ................... A01C 7/16 222/200 |
| 4,747,343 A | * | 5/1988 | St. Clair ................ A01F 25/14 100/145 |
| 5,140,802 A | * | 8/1992 | Inman .................... A01F 25/14 141/114 |
| 5,215,228 A | * | 6/1993 | Andrews ................ B65D 88/66 222/203 |
| 7,252,309 B2 | * | 8/2007 | Eng Soon ............... B01F 5/241 105/250 |
| 2005/0081740 A1 | * | 4/2005 | Lissa ....................... B61D 3/16 105/248 |
| 2007/0210080 A1 | * | 9/2007 | Hooper ................. B65D 88/121 220/1.5 |
| 2008/0010953 A1 | * | 1/2008 | Wingert .................. A01F 25/14 53/527 |
| 2014/0175093 A1 | * | 6/2014 | Van Romer .......... B65D 90/205 220/9.4 |
| 2014/0246362 A1 | * | 9/2014 | Biss ....................... B65D 88/60 209/346 |
| 2015/0368039 A1 | * | 12/2015 | Cochrum ............... B65D 88/66 406/75 |

FOREIGN PATENT DOCUMENTS

| | | | | |
|---|---|---|---|---|
| FR | | 2755578 A1 | * 5/1998 | ......... A01F 25/2027 |
| FR | | 2804417 A1 | * 8/2001 | ......... A01F 25/2027 |
| JP | | 08256588 A | 10/1996 | |
| WO | | 2014201497 A1 | 12/2014 | |
| WO | WO | 2015010249 A1 | * 1/2015 | ............. B65G 65/44 |

* cited by examiner

DEMOUNTABLE SILO

This application claims the priority of Australian provisional patent application no. 2013902167 and New Zealand complete patent application no. 620553 the entire disclosures of which are incorporated herein by reference.

TECHNICAL FIELD

The present invention relates broadly to a silo module of a demountable silo and a method of constructing the demountable silo.

BACKGROUND OF INVENTION

Traditionally with temporary grain or hay storage a barn or shed is provided with a concrete floor upon which the grain or hay is deposited in heaps. The provision of a storage barn or shed is expensive to construct and relocate. Farmers may revert to heaping of the grain or hay on the ground. In this case the heaped grain may be covered with a tarpaulin. However, this manner of temporary storage is inadequate and exposes the grain to moisture and is susceptible to ground-based attacks from rats, mice, mould and contaminants, and other foreign matter.

Alternatively, it is common to store granular products such as grain in silos. Grain silos are generally cylindrical in shape having a conical or frusto-conical base and/or roof. The cylindrical body is fabricated from sheet steel in a series of ring segments secured upon one another via multiple fasteners such as tek screws. The base and roof are also fabricated from sheet steel which is cut and folded then fastened in the required configuration. The silos are typically constructed in a metal fabrication factory and then transported to site e.g. for on-farm grain storage. The cylindrical metal silo is relatively expensive to manufacture, difficult to transport, and expensive to maintain.

SUMMARY OF INVENTION

According to one aspect of the present invention there is provided a silo module of a demountable silo, said module comprising:
 a base structure being adapted to locate on the ground;
 a support structure mounted upon the base structure and being generally elongate and substantially V-shaped in cross-section;
 one or more lining panels fitted to the support structure to allow or retention of particulate matter within the silo module.

According to another aspect of the invention there is provided a demountable silo comprising:
 a plurality of interconnected silo modules each comprising:
  a base structure being adapted to locate on the ground;
  a support structure mounted upon the base structure and being generally elongate and substantially V-shaped in cross-section;
  one or more lining panels fitted to the support structure to allow for retention of particulate matter within the demountable silo.

According to a further aspect of the invention there is provided a method of constructing a demountable silo, said method comprising the steps of:
 providing a plurality of silo modules including the steps of:
  erecting a base structure;
  mounting a support structure upon the base structure, the support structure being generally elongate and substantially V-shaped in cross-section;
  lining the support structure with one or more lining panels to form at least one of the plurality of silo modules;
 interconnecting the plurality of silo modules to form the demountable silo.

Preferably the silo module also comprises a pair of tension members located at respective longitudinal ends of the support structure and transversely interconnecting upper ends of the V-shaped structure.

Preferably the silo module further comprises a pair of brackets detachably connected to respective ends of one of the pair of tension members. More preferably one of the pair of brackets is adapted to connect to an adjacent silo module to provide at least part of the demountable silo. Even more preferably said bracket is detachably connected to an adjacent tension member of the adjacent module.

Preferably the support structure includes a pair of framework structures mounted either side of the base structure and each including a pair of longitudinal support members arranged parallel to one another and interconnected by a plurality of transverse support members. More preferably each of the framework structures are prefabricated.

Preferably the base structure includes a series of ground pedestals located transverse to and spaced longitudinally underneath the support structure. More preferably each of the ground pedestals includes an elongate foot member to which a support cradle is connected via one or more struts. Even more preferably the support cradle includes a pair of cradle members interconnected at an obtuse angle which substantially equals a corresponding obtuse angle at which the pair of framework structures are oriented relative to one another. Still more preferably the foot members include coupling elements at respective ends to permit detachable connection to an adjacent silo module to provide at least part of the demountable silo.

Preferably the silo module further comprises an auger assembly mounted to the base structure and extending along a lower section of the support structure to permit extraction of particulate matter from the silo module. More preferably the auger assembly includes a trench member within which a screw auger is located.

Preferably the lining panel (s) include a pair of inclined cladding sheets mounted to respective of the pair of framework structures. More preferably the lining panels include a pair of end walls connected to the support structure at its respective ends to substantially enclose the silo module. Alternatively the cladding sheet is provided by a half-segment of an inverted V-shaped cladding sheet which bridges and partly clads adjacent of the silo modules.

Preferably the silo module is demountable.
Preferably the demountable silo is constructed in-situ.
Generally the base structure and the support structure is fabricated from tubular steel in RHS or SHS.
Generally the lining panels are fabricated from sheet steel.

BRIEF DESCRIPTION OF DRAWINGS

In order to achieve a better understanding of the nature of the present invention a preferred embodiment of a silo module of a demountable silo will now be described, by way of example only, with reference to the accompanying drawings in which.

DETAILED DESCRIPTION

Figure 1:
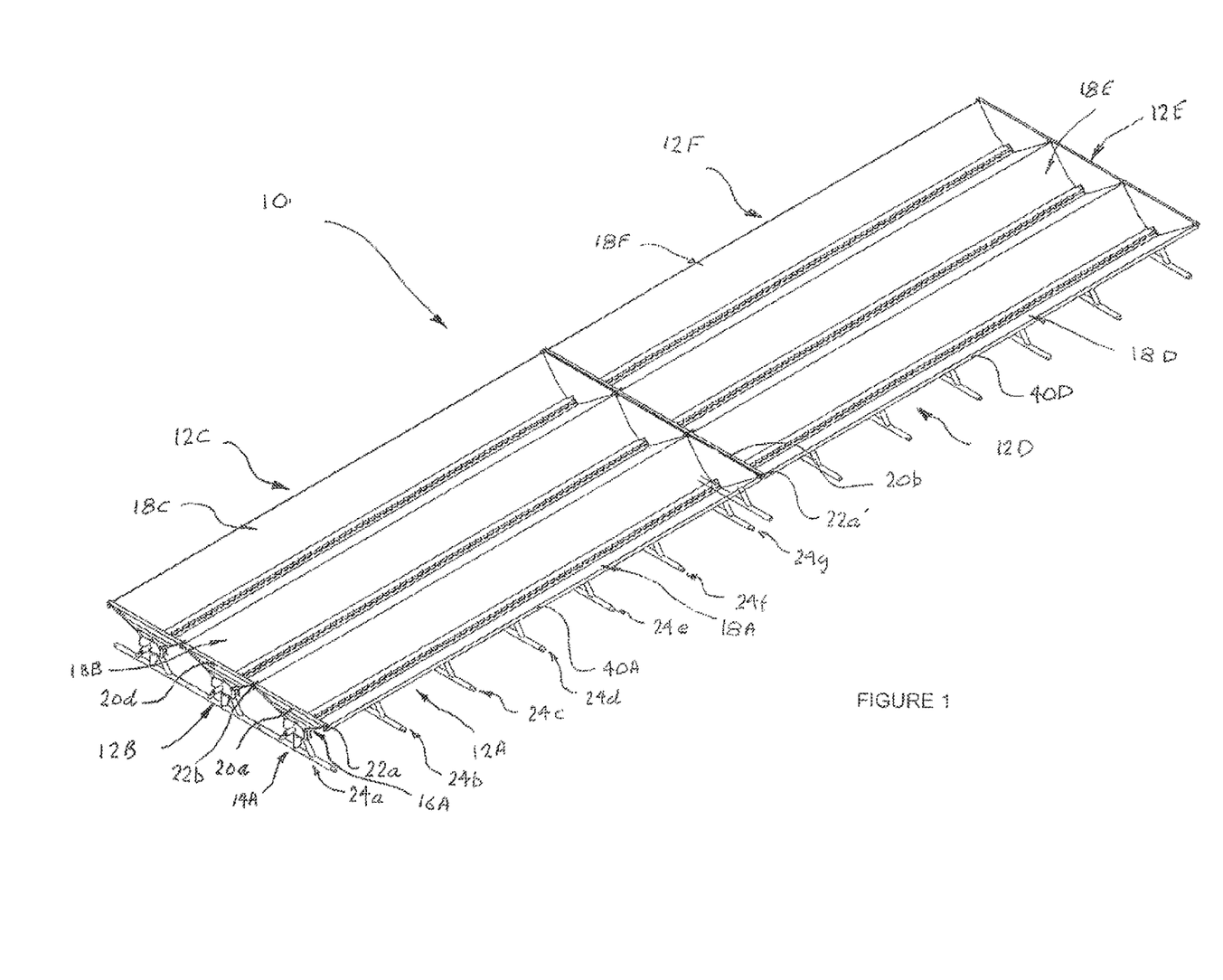
FIG. 1 is a perspective view of an embodiment of a series of silo modules arranged in a side-by-side and end-to-end relationship to provide a demountable silo according to the invention.
Figure 2:
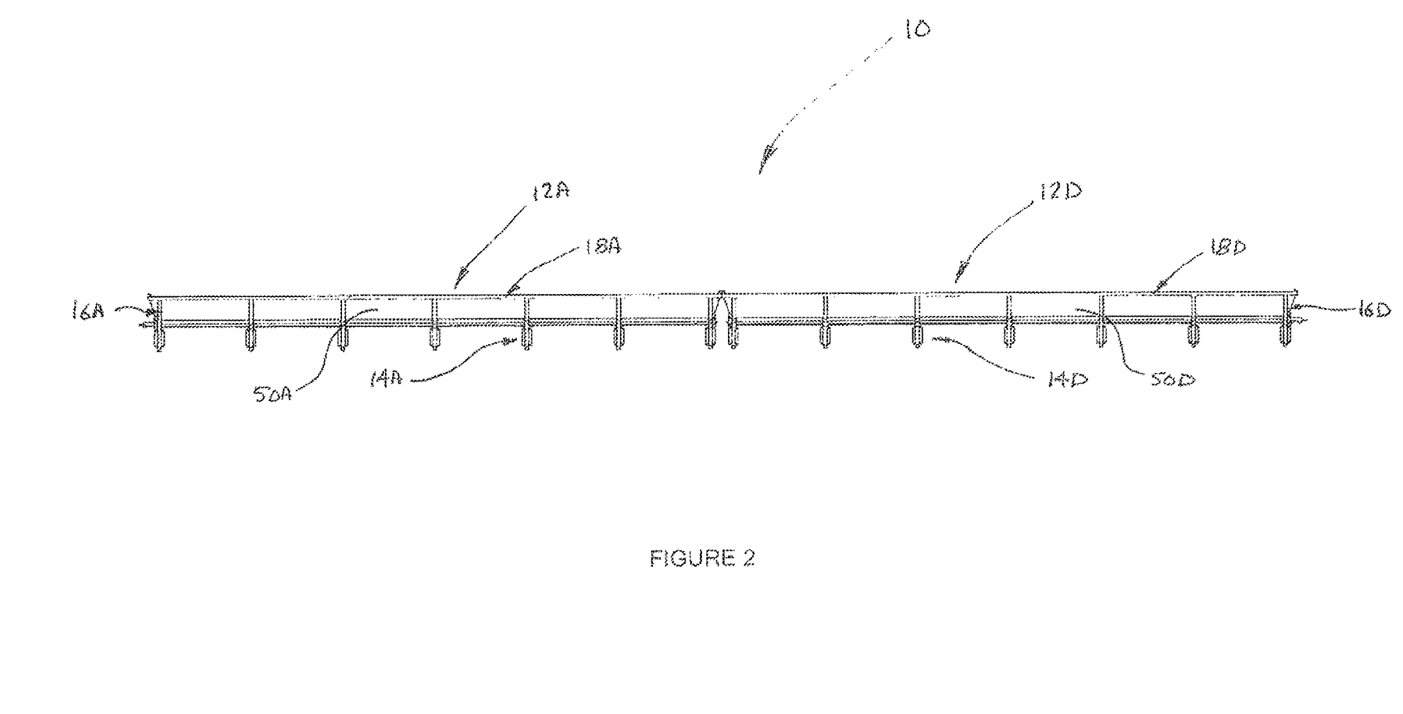
FIG. 2 is a side elevational view of the preferred embodiment of the demountable silo of FIG. 1.
Figure 3:
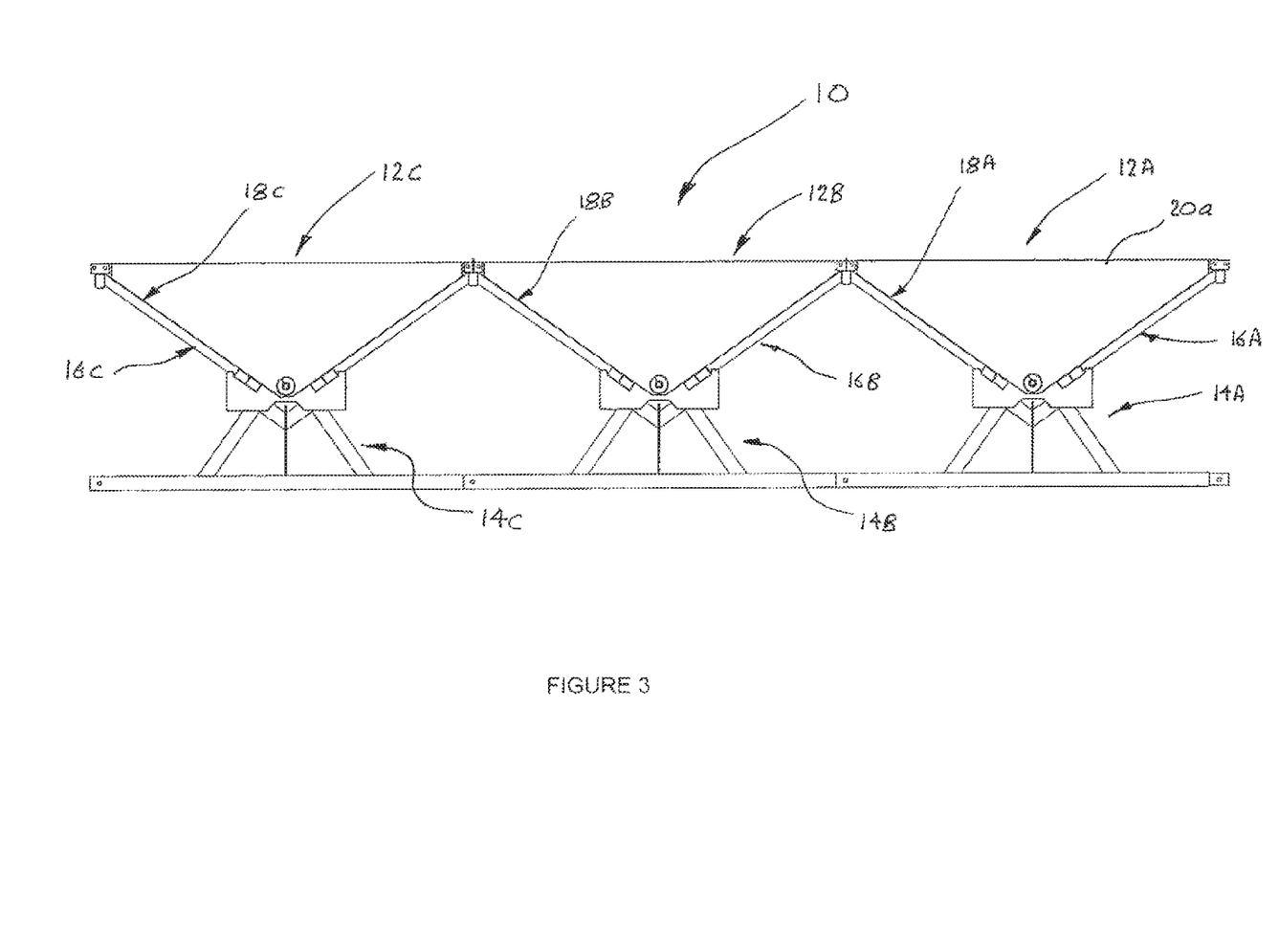
FIG. 3 is an end elevational view of the preferred embodiment of the demountable silo of FIGS. 1 and 2.

As shown in FIGS. 1 to 3 there is a demountable silo 10 comprising a series of interconnected silo modules 12A to 12F constructed in accordance with a preferred embodiment of this invention. The silo modules such as 12A are each of a substantially identical configuration and interconnected in a side-by-side and end-to-end relationship. The demountable silo 10 of this example is arranged in three (3) rows and two (2) columns of the silo modules 12A to 12F. The demountable silo 10 is designed to contain particulate matter including granular product and configured depending on the nature of the particulate matter and its storage requirements. The provision of multiple silo modules such as 12A to 12F together contains significantly more particulate matter in a heap than a single silo module. The maximum storage capacity for the demountable silo 10 is determined largely by the angle of repose of the heaped granular products. This system utilizing multiple modules such as 12A to 12F thus exponentially increases storage and reduces the cost per tonne of storage. The demountable silo 10 may be dedicated to temporary storage of the same particulate matter or different products such as granular fertilizers and grain feed. The silo modules such as 12A are designed so that the different products stored in the same demountable silo 10 do not contaminate one another. It is possible that for example granular fertilizers can be removed from the demountable silo 10 whilst grain feed is heaped within different modules of the silo 10 with substantially no risk of cross-contamination.

Figure 4:
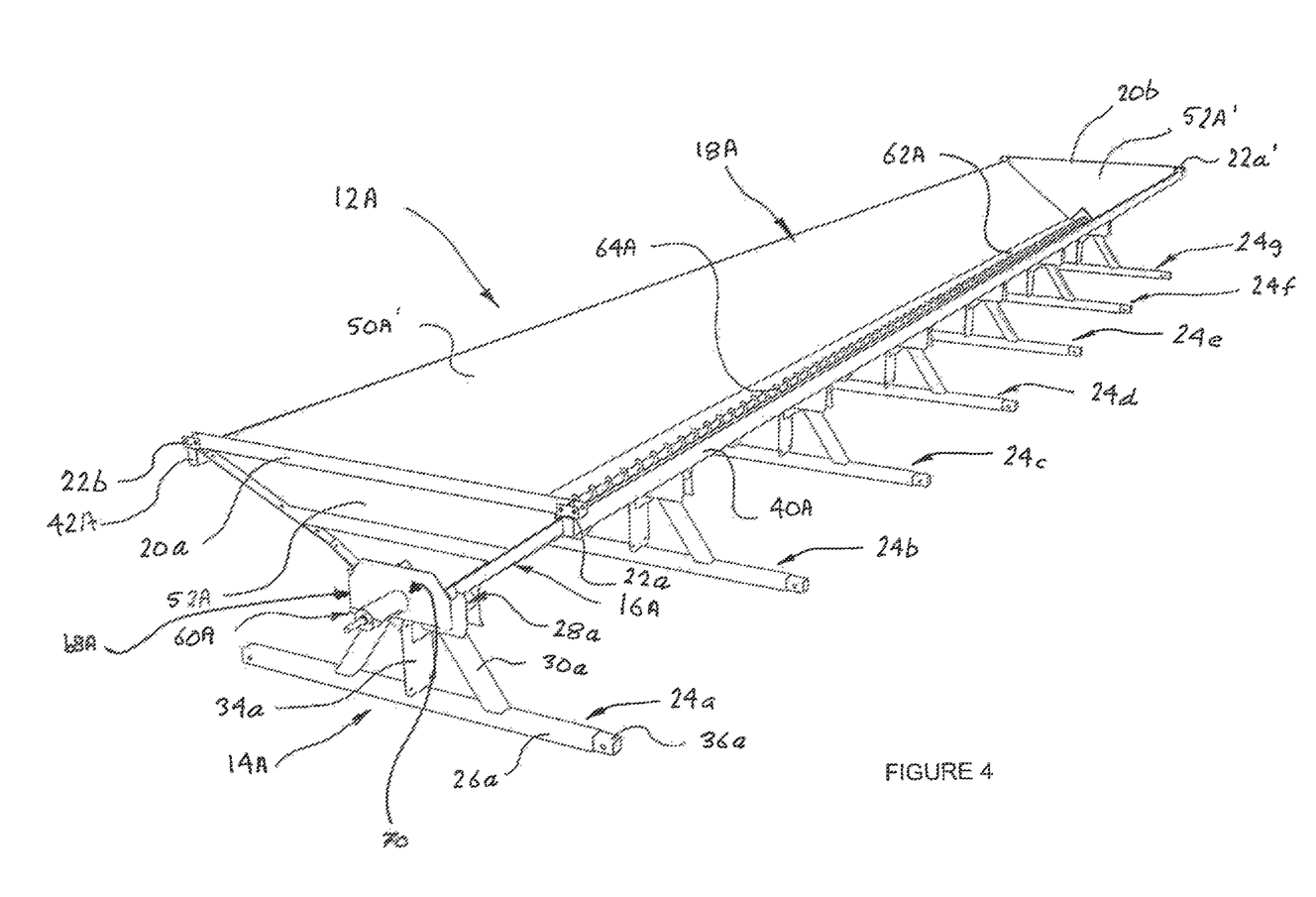
FIG. 4 is a perspective view from above of one of the silo modules take demountable silo of the preceding figures.
Figure 5:
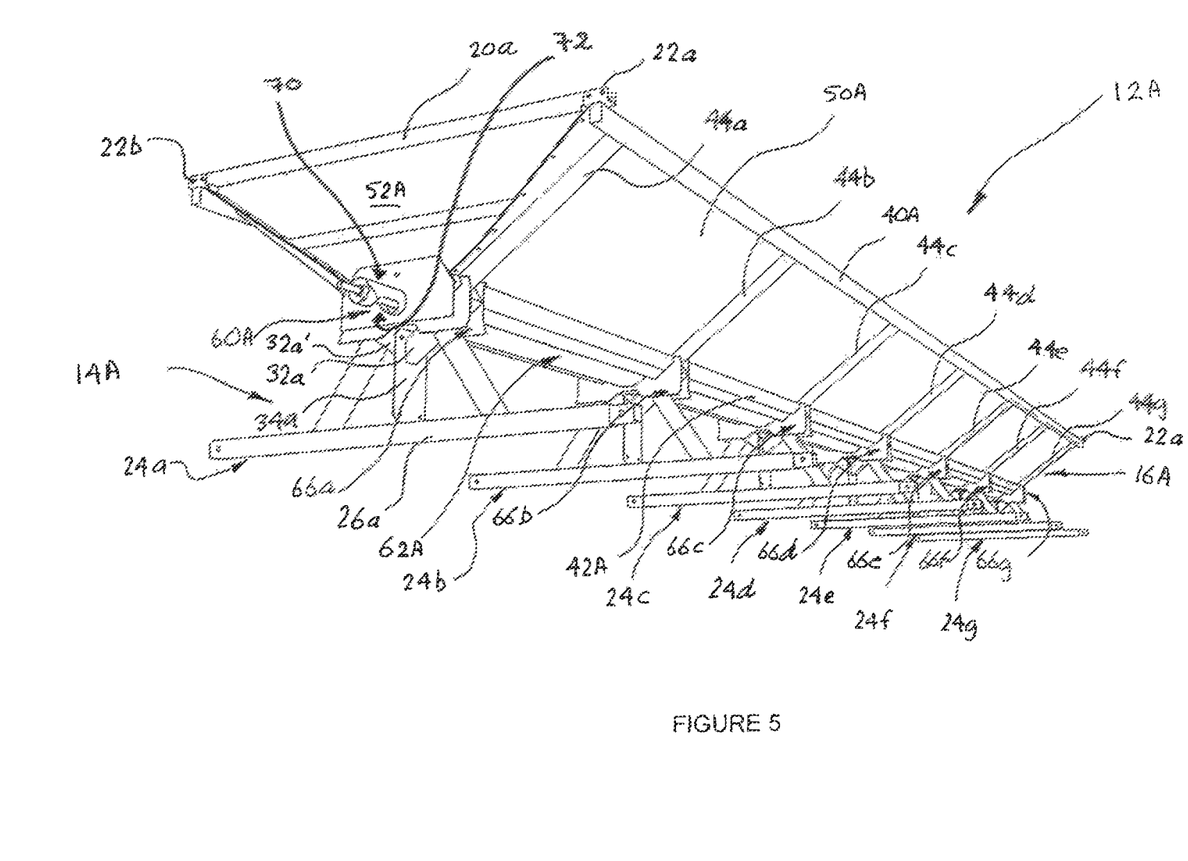
FIG. 5 is a perspective view from below of the silo module of FIG. 4.
Figure 6:
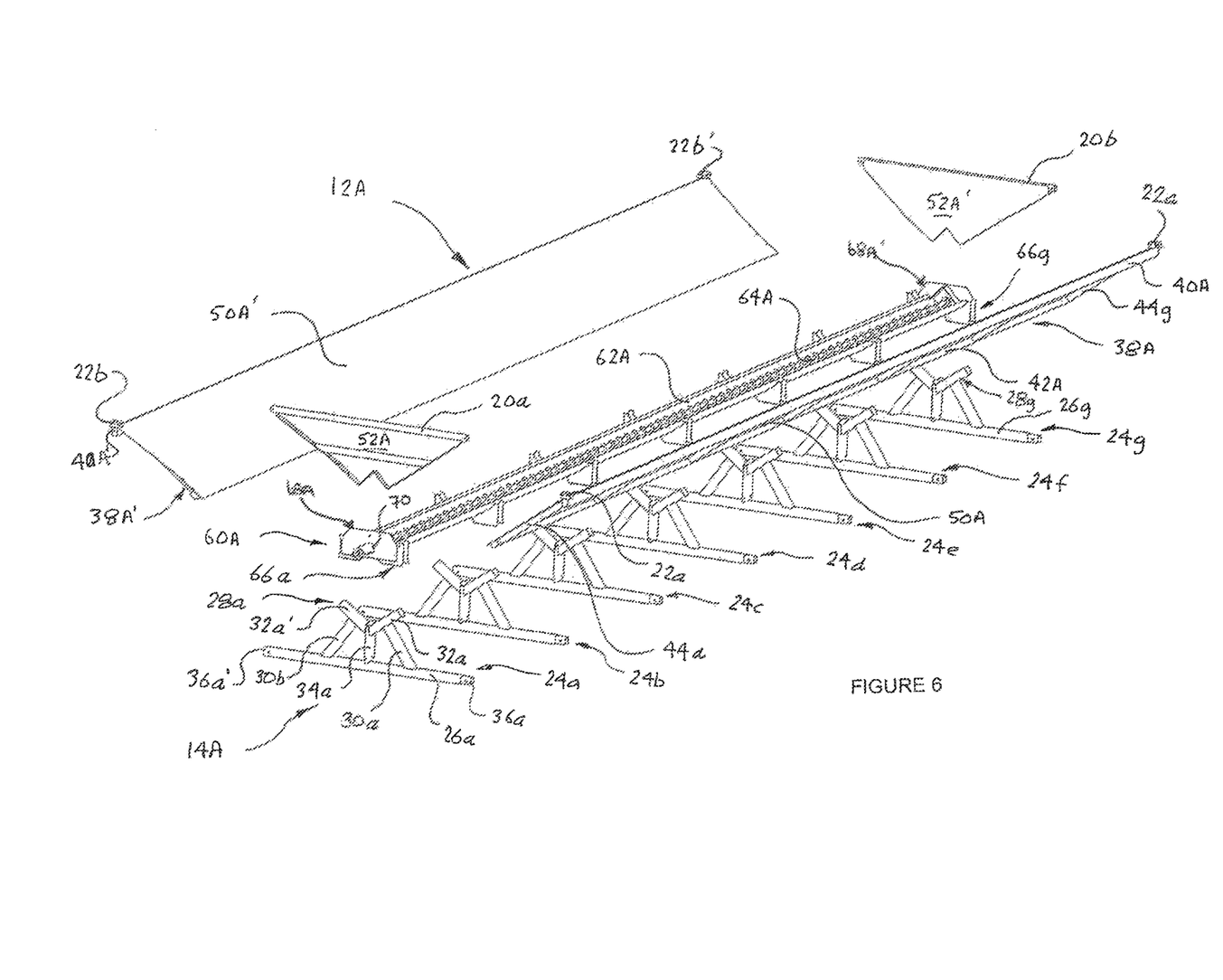
FIG. 6 is an exploded perspective view of the silo module of FIGS. 4 and 5.

FIGS. 4 to 6 illustrate a single silo module in this case 12A taken from the demountable silo 10 of the preceding figures. The silo module 12A comprises the base structure 14A upon which a support structure 16A is mounted. The support structure 16A is elongate and substantially V-shaped in cross-section having one or more lining panels such as 18A fitted to it for retention of particulate matter. The support structure 16A is at each of its ends interconnected by a transversely extending tension member such as 20a and 20b. The silo module 12a also comprises a pair of brackets such as 22a and 22b mounted to the support structure 16A and designed to provide detachable connection to adjacent of the tension members such as 20a and 20d. The brackets 22a and 22b also provide detachable connection for respective ends of the tension member such as 20a which acts as a stay for the support structure 16A.

The base structure 14A of this embodiment includes a series of ground pedestals 24a to 24g of a substantially identical construction to one another and spaced longitudinally underneath the support structure 16A. In this embodiment each of the ground pedestals such as 24a includes an elongate foot member 26a to which a support cradle 28a is connected via a pair of struts such as 30a and 30b. The support cradle 28a includes a pair of cradle members 32a and 32a interconnected at an obtuse angle relative to one another at a central post 34a. The foot members such as 26a each include coupling elements 36a and 36a' at respective ends to permit connection to an adjacent silo module.

The support structure 16A of this embodiment includes a pair of substantially identical framework structures 38A and 38A' each including a pair of longitudinal support members such as 40A and 42A arranged parallel to one another and interconnected by a plurality of transverse support members such as 44a to 44g. The framework structure 38A is designed so that each of the transverse members 44a to 44g aligns with respective of the ground pedestals 24a to 24g. The longitudinal support members or beams 40A thus extend the length of the silo module 12A. The brackets such as 22a and 22a' are securely mounted to respective ends of the support beam 40A. The adjacent or neighbouring silo module 12B shares the support beam 40A' to which the bracket 22b is secured for interconnection of the side-by-side modules 12A and 12B. The silo modules are also interconnected side-by-side at the foot members such as 26a of the ground pedestals 24a wherein the silo modules are each of substantially equal width.

The silo module 12A is in this embodiment clad with a pair of lining panels 50A and 50A' shaped to substantially correspond with framework structure 38A and 38A. The cladding sheets such as 50A are fastened to the underlying support structure 16A. The silo module 12A is enclosed by a pair of end walls such as 52A connected to the support structure 16A at its respective ends. In another embodiment shown in FIG. 7 adjoining of the sides of the adjacent silo modules such 12A and 12B may be clad with an inverted V-shaped cladding sheet 54 which bridges the modules such as 12A and 12B. The inverted V-sheet 54 ties adjacent of the modules 12A/12B together providing additional stability to the demountable silo 10. For ease of reference and to avoid repetition the same reference numerals have been used for components of this other embodiment which generally correspond with components of the preceding embodiment. Not all components of this other embodiment have been designated with reference numerals.

The silo module such as 12A also comprises an auger assembly 60A mounted to the base structure 14A and being generally elongate and extending along a lower section of the support structure 16A. The auger assembly 60A includes a trench member 62A within which a screw auger 64A is located to allow extraction of particulate matter from the silo module 12A. The trench member 62A includes pairs of mounting webs 66a to 66g spaced longitudinally along the trench member 62A. The web mounts such as 66a are dedicated to respective of the ground pedestals such as 24a for location of the auger assembly 60A within the silo module 12A. The framework structure such as 38A is also configured wherein its transverse members such as 44a to 44g locate within respective of the web mounts 66a to 66g. As shown in, for example, FIG. 6, the trench member 62A further includes a pair of plates 68A, 68A' mounted externally to a corresponding one of the two end walls 52A, 52A' of the silo module 12A at opposing ends of the trench member 62A. Referring specifically to FIGS. 4 to 9, plate 68A comprises an aperture (not shown) enshrouded by a tubular sleeve 70 through which extends a corresponding end portion of the screw auger 64A. The sleeve 70 comprises a generally elongate aperture 72 that extends substantially through a lower wall portion of the sleeve 70. As will be apparent from FIG. 5, the aperture 72 in the sleeve 70 of the auger assembly 60A defines an outlet from which particulate matter that has been carried by the screw auger 64A along the trench member 62A to an end of the silo module 12A may be extracted by gravity.

The silo modules such as 12A are thus assembled from key components which are each substantially identical lending each of the modules to kit-style construction. In the preceding embodiments the key components include the base structure 14A, the support structure 16A, the lining panels such as 18A including cladding sheets 50A and end walls 52A, and the auger assembly 60A. In this example the silo module 12A has storage capacity on its own to store up to around 500 tonne of grain which is increased exponentially (rather than proportionally) when a plurality of the modules are interconnected in the form of a demountable silo 10 in a side-by-side and/or end-to-end configuration. If one of the silo modules such as 12A is damaged it merely requires replacement of that module in the demountable silo 10 rather than replacement of for example the entire gain silo of the prior art. The silo module 12A may also be repaired by replacement of the damaged key component rather than replacement of the entire silo module.

The present invention in another aspect is directed to a method of constructing a demountable silo 10 such as that described in the preceding paragraphs. The demountable silo 10 together with each of the silo modules such as 12A to 12F are generally constructed in-situ. The general steps involved in construction of each of the silo modules such as 12A are as follows:
1. Erecting a base structure 14A preferably having a series of prefabricated ground pedestals 24a to 24g;
2. Mounting a support structure 16A upon the base structure 14A wherein the support structure is preferably prefabricated as a pair of framework structures 38A and 38A';
3. Lining the support structure 16A with cladding panels 50A and 50A' and preferably enclosing the silo module 12A with end walls 52A and 52A'.

The demountable silo 10 is constructed by interconnecting the required number of silo modules such as 12A in a side-by-side and/or end-to-end relationship. The general steps involved in interconnecting the silo modules such as 12A to 12F in this manner are as follows:
1. Side-by-side modules such as 12A and 12B are interconnected preferably by detachable connection of the stay members such as 20a to the common bracket 22b;
2. Adjacent ground pedestals such as 24a and 24a are interconnected via their respective coupling elements 36a';
3. End-to-end silo modules such as 12A and 12D are preferably interconnected via common brackets 22a'.

The base structure and the support structure such as 14A and 16A respectively may be fabricated from tubular steel in RHS or SHS. The lining panels such as 50A may be fabricated from sheet steel.

Figure 7:
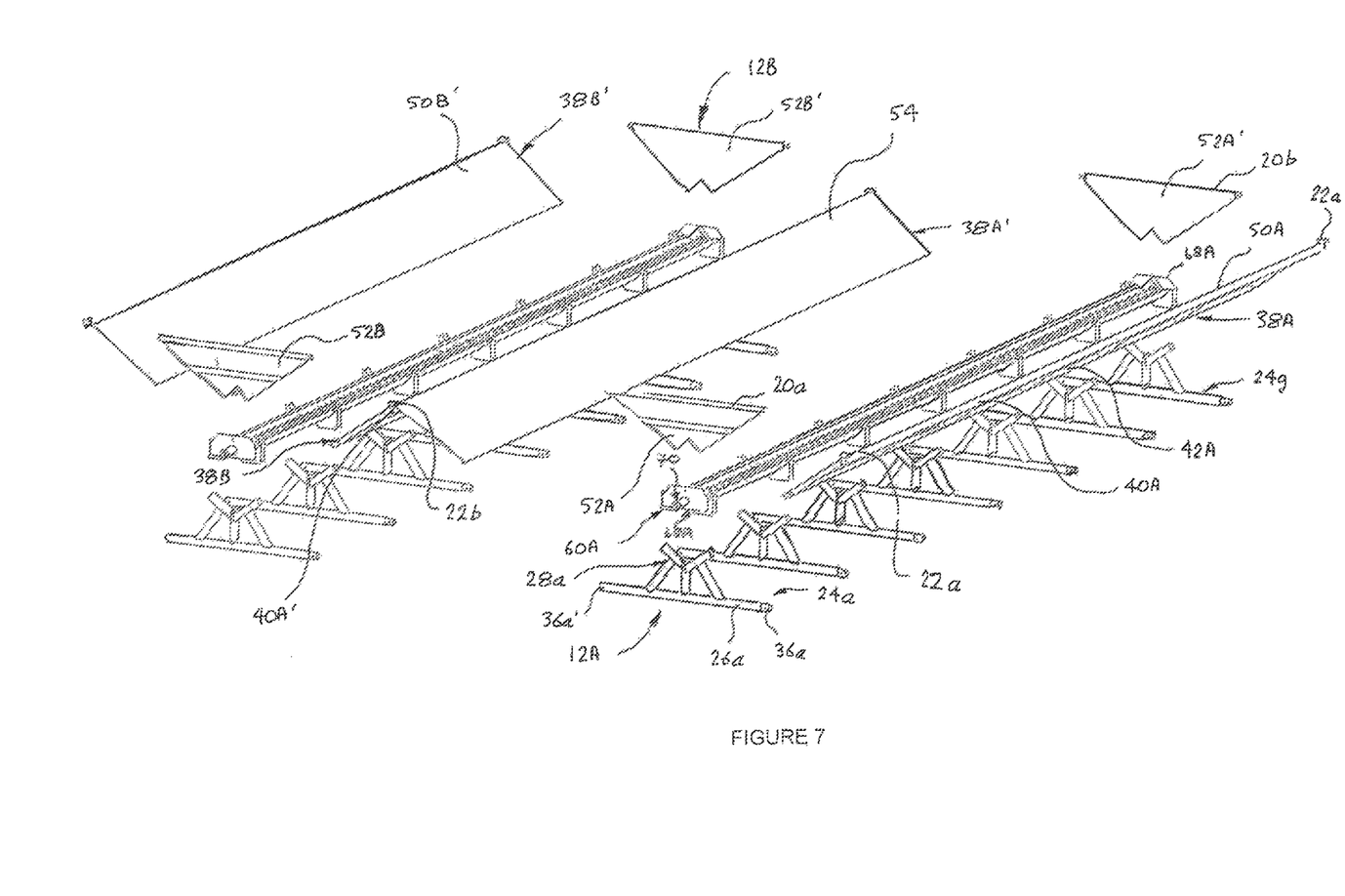
FIG. 7 is an exploded perspective view of another embodiment of silo modules arranged in a side-by-side relationship to provide a demountable silo.
Figure 8:
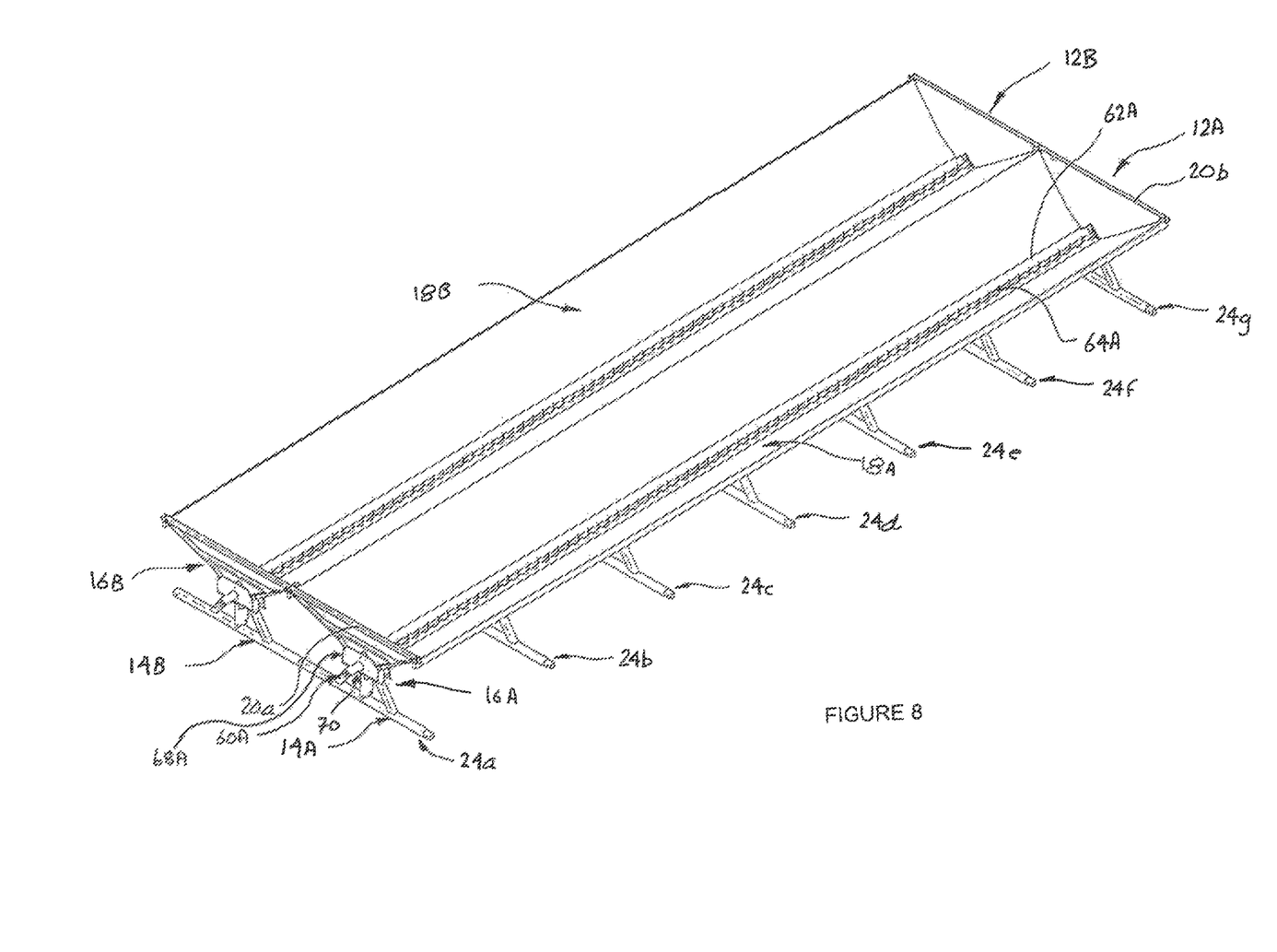
FIG. 8 is a perspective view from above of two of the silo modules of FIGS. 4 to 6 shown in a side-by-side relationship.
Figure 9:
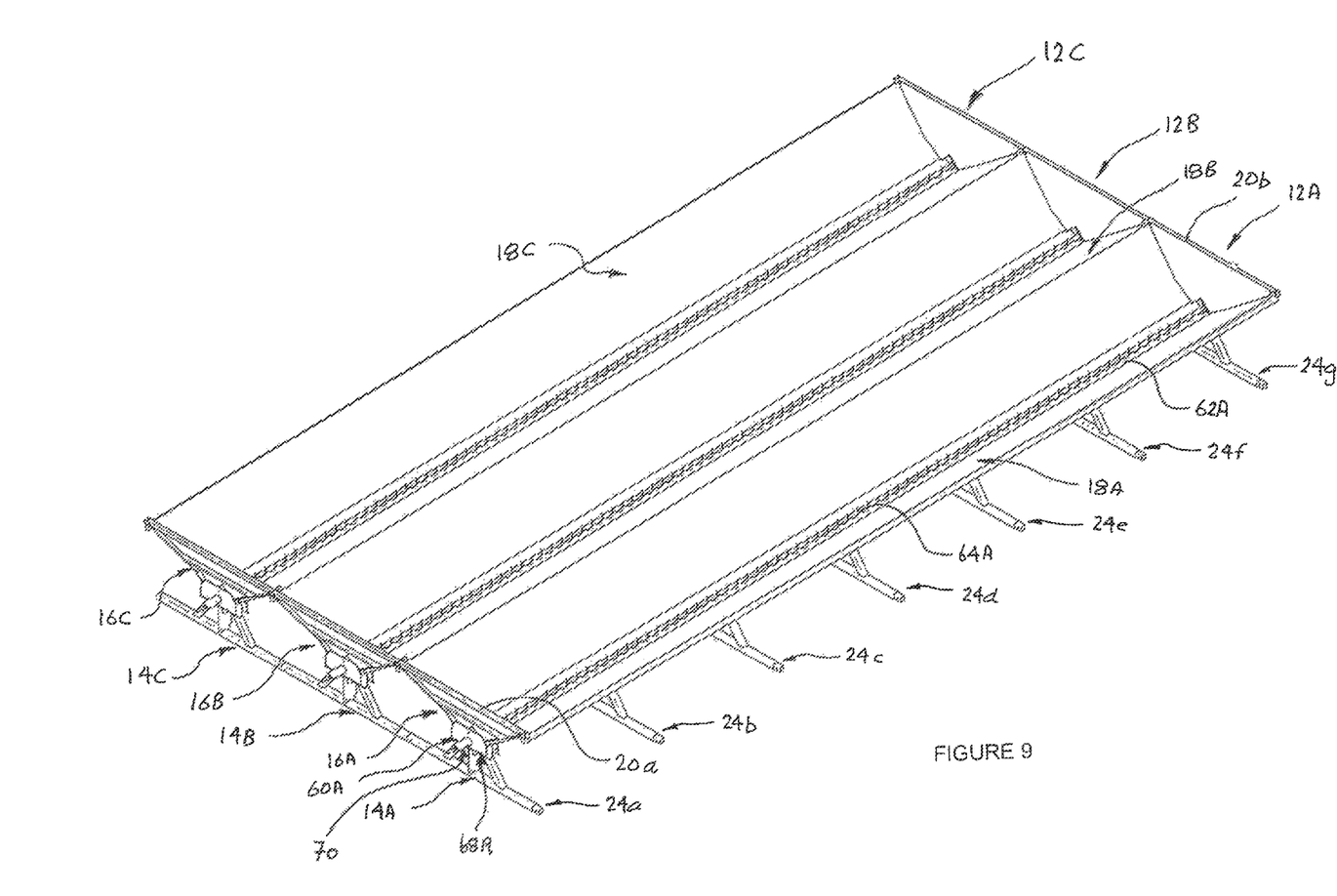
FIG. 9 is a perspective view from above of three of the silo modules of FIGS. 4 to 6 shown in a side-by-side relationship.

The demountable silo 10 may be of a different configuration to that described. FIGS. 7 and 8 depict variations on the theme where two and three silo modules respectively are arranged in a side-by-side relationship. In these examples the silo modules are substantially identical to the modules such as 12A of the previous embodiment. In each of these embodiments the silo modules are preferably sized to permit transportation on a semi-trailer truck. The silo module 12A is around 12 meters in length and anywhere from 2 to 2.5 meters wide. The silo module 12A may be pre-constructed in a factory for interconnection in-situ. However, this limits the number of silo modules which can be transported to site. Therefore, in another embodiment, the silo modules are generally flat-packed for transportation to site where they are erected.

Now that a preferred embodiment of the invention has been described, it will be apparent to those skilled in the art that the silo module and demountable silo have the following advantages over the admitted prior art:
1. The modular construction of the demountable silo lends itself to construction in-situ;
2. The modular nature also lends itself to scaling up or down depending on the application and storage requirements with relative ease;
3. The silo modules are configured for ease of transportation in either a pre-constructed or flat-pack form;
4. The demountable silo can be configured based largely on the number of silo modules to accommodate or contain relatively large volumes of particulate matter.

Those skilled in the art will appreciate that the invention described herein is susceptible to variations and modifications other those specifically described. For example, the silo modules need not be limited to the sizes and materials described. The silo modules need not include an auger assembly in which case a device external to the silo itself may be used for removal or extraction of particulate matter. The silo modules are designed to contain practically any granular products or particulate material including wheat and other grains, superphosphate and other granular fertilizers, particulate matter including minerals and ores in the mining and resources sector, and particulate matter including stock feed pellets and milk powder in the food industry. All such variations and modifications are to be considered within the scope of the present invention the nature of which is to be determined from the foregoing description.

The invention claimed is:

1. A silo module of a demountable silo, the silo module comprising:
   a base structure being adapted to locate on the ground;
   a support structure mounted upon the base structure and being generally elongate and substantially V-shaped in cross-section;
   one or more lining panels fitted to the support structure to allow for retention of a particulate matter within the silo module; and
   an auger assembly mounted to the base structure and extending along a lower section of the support structure to permit extraction of the particulate matter from a longitudinal end of the silo module, wherein the base structure and the support structure allow the silo module to be interconnected with one or more similar silo modules in a side-by-side and/or an end-to-end relationship to provide a demountable silo.

2. The silo module of claim 1 further comprising a pair of tension members located at respective longitudinal ends of the support structure and transversely interconnecting upper ends of the V-shaped structure.

3. The silo module of claim 2 further comprising a pair of brackets detachably connected to respective ends of one of the pair of tension members.

4. The silo module of claim 3 wherein one of the pair of brackets is adapted to connect to an adjacent silo module to provide at least part of the demountable silo.

5. The silo module of claim 4 wherein one of the pair of brackets is detachably connected to an adjacent tension member of the adjacent silo module.

6. The silo module of claim 1 wherein the support structure includes a pair of framework structures mounted either side of the base structure and each including a pair of longitudinal support members arranged parallel to one another and interconnected by a plurality of transverse support members.

7. The silo module of claim 6 wherein each of the framework structures are prefabricated.

8. The silo module of claim 6 wherein the base structure includes a series of ground pedestals located transverse to and spaced longitudinally underneath the support structure.

9. The silo module of claim 8 wherein each of the ground pedestals includes an elongate foot member to which a support cradle is connected via one or more struts.

10. The silo module of claim 9 wherein the support cradle includes a pair of cradle members interconnected at an obtuse angle which substantially equals a corresponding obtuse angle at which the pair of framework structures are oriented relative to one another.

11. The silo module of claim 9 wherein the foot members include coupling elements at respective ends to permit detachable connection to an adjacent silo module to provide at least part of the demountable silo.

12. The silo module of claim 1 wherein the auger assembly includes a trench member within which a screw auger is located.

13. The silo module of claim 6 wherein the one or more lining panels includes a pair of inclined cladding sheets mounted to respective of the pair of framework structures.

14. The silo module of claim 13 wherein the one or more lining panels includes a pair of end walls connected to the support structure at its respective ends to substantially enclose the silo module.

15. The silo module of claim 13 wherein the cladding sheet is provided by a half-segment of an inverted V-shaped cladding sheet which bridges and partly clads adjacent of the silo modules.

16. The silo module of claim 1 wherein the silo module is demountable.

17. A demountable silo comprising:
a plurality of interconnected silo modules each comprising:
a base structure being adapted to locate on the ground;
a support structure mounted upon the base structure and being generally elongate and substantially V-shaped in cross-section;
one or more lining panels fitted to the support structure to allow for retention of a particulate matter within the demountable silo; and
an auger assembly mounted to the base structure and extending along a lower section of the support structure to permit extraction of the particulate matter from a longitudinal end of the silo module, wherein the base structure and the support structure allow the silo module to be interconnected with one or similar silo modules in a side-by-side and/or an end-to-end relationship to provide a demountable silo.

18. The demountable silo of claim 17 wherein the demountable silo is constructed in-situ.

19. A method of constructing a demountable silo, the method comprising the steps of:
providing a plurality of silo modules including the steps of:
erecting a base structure;
mounting a support structure upon the base structure, the support structure being generally elongate and substantially V-shaped in cross-section;
lining the support structure with one or more lining panels to form at least one of the plurality of silo modules;
mounting an auger assembly to the base structure, the auger assembly extending along a lower section of the support structure to permit extraction of particulate matter from a longitudinal end of the silo module; and
interconnecting the plurality of silo modules in a side-by-side and/or an end-to-end relationship with similar ones of the silo modules to form the demountable silo.

* * * * *